US008811899B2

United States Patent
Oh et al.

(10) Patent No.: US 8,811,899 B2
(45) Date of Patent: Aug. 19, 2014

(54) COMMUNICATION SYSTEM AND METHOD OF CONTROLLING THE SAME

(75) Inventors: Yong Taek Oh, Gyeonggi-do (KR); Young Bin Cho, Yongin-si (KR)

(73) Assignee: LG Innoteck Co., Ltd., Seoul (KR)

( * ) Notice: Subject to any disclaimer, the term of this patent is extended or adjusted under 35 U.S.C. 154(b) by 317 days.

(21) Appl. No.: 12/677,063

(22) PCT Filed: Sep. 11, 2008

(86) PCT No.: PCT/KR2008/005371
§ 371 (c)(1),
(2), (4) Date: Mar. 8, 2010

(87) PCT Pub. No.: WO2009/035274
PCT Pub. Date: Mar. 19, 2009

(65) Prior Publication Data
US 2011/0003547 A1    Jan. 6, 2011

(30) Foreign Application Priority Data
Sep. 14, 2007  (KR) .................. 10-2007-0093429

(51) Int. Cl.
*H04B 7/00* (2006.01)
(52) U.S. Cl.
USPC ................. 455/41.2; 455/33; 455/456.1
(58) Field of Classification Search
CPC ................................................ H04W 84/10
USPC ............................ 455/41.2, 33, 456.1
See application file for complete search history.

(56) References Cited

U.S. PATENT DOCUMENTS

| 5,014,342 A * | 5/1991 | Pudsey .................. 455/447 |
| 2003/0018889 A1 | 1/2003 | Burnett et al. |
| 2006/0294216 A1 | 12/2006 | Swanson et al. |
| 2007/0155401 A1 * | 7/2007 | Ward et al. ............ 455/456.1 |

FOREIGN PATENT DOCUMENTS

| CN | 1728724 A | 2/2006 |
| CN | 101018177 A | 8/2007 |
| JP | 7-115681 A | 5/1995 |
| JP | 10-326384 A | 12/1998 |

(Continued)

OTHER PUBLICATIONS

First Office Action dated Feb. 29, 2012 in Chinese Application No. 200880111587.6, filed Sep. 11, 2008.

(Continued)

*Primary Examiner* — Hsin-Chun Liao
(74) *Attorney, Agent, or Firm* — Saliwanchik, Lloyd & Eisenschenk

(57) ABSTRACT

Disclosed are a communication system and a control method thereof. The communication system comprises a terminal apparatus for converting regional information or position information into network connection information, and a communication apparatus for performing network communication by generating a data packet comprising the network connection information. In the communication system and the control method thereof, a number, a floor and a room of a building, a number of a shelf, a multilayer, and positions of goods are input, so that a network having no data collision is established, and thus a user conveniently use an office/home network service. An integral input system for network connection information is provided using regional or position information, so that communication is stably performed without using an additional manager.

14 Claims, 3 Drawing Sheets

(56) References Cited

FOREIGN PATENT DOCUMENTS

| | | |
|---|---|---|
| JP | 2003-289586 A | 10/2003 |
| JP | 2004-023329 A | 1/2004 |
| JP | 2004-236278 A | 8/2004 |
| JP | 2005-217552 A | 8/2005 |
| KR | 10-2004-0102564 A | 12/2004 |
| KR | 10-2007-0075097 A | 7/2007 |
| KR | 10-2007-0089284 A | 8/2008 |
| WO | WO-2007/069816 A1 | 6/2007 |

OTHER PUBLICATIONS

International Search Report in International Application No. PCT/KR2008/005371, filed Sep. 11, 2008.
Office Action dated Dec. 3, 2012 in Chinese Application No. 200880111587.6, filed Sep. 11, 2008.
Supplementary European Search Report dated Jul. 3, 2012 in European Application No. 08831056.0, filed Sep. 11, 2008.
Office Action dated Oct. 2, 2012 in Japanese Application No. 2010-524782, filed Sep. 11, 2008.

\* cited by examiner (a)   (b)   (c)

COMMUNICATION SYSTEM AND METHOD OF CONTROLLING THE SAME

CROSS-REFERENCE TO RELATED APPLICATIONS

This application is the U.S. national stage application of International Patent Application No. PCT/KR2008/005371, filed Sep. 11, 2008, which claims priority to Korean Application No. 10-2007-0093429, filed Sep. 14, 2007, the disclosures of each of which are incorporated herein by reference in their entirety.

TECHNICAL FIELD

The present invention relates to a communication system and a control method thereof.

BACKGROUND ART

With the development of communication technology, incoming and outgoing of various devices or products have been controlled and managed by establishing a WPAN (wireless personal area network), such as ZigBee, WLAN (WiFi) and UWB, in an office space, a residential space, a shop and the like.

In WPAN technology, a plurality of devices is interconnected by forming various network topologies, such that a user can use or manage the devices. Further, since the WPAN technology has an advantage of low power consumption, the WPAN technology has been extensively used in various fields.

In the case of establishing a personal network using the WPAN technology, specific information is required for identifying communication areas. For example, in the case of establishing a personal network using the ZigBee, specific channel numbers corresponding to the communication areas and network information such as PAN IDs must be input into a ZigBee device.

However, since a process of inputting and setting the network information is professional work, an ordinary user may feel difficult to directly input the network information.

Further, in the case of establishing a plurality of networks in a limited region such as a building and an apartment, since an integral input system has not been provided, a user must input all network information one by one.

Furthermore, in the case of a personal network, since network information is not systematically set, collision may frequently occur between networks.

DISCLOSURE OF INVENTION

Technical Problem

Embodiments of the present invention provide a communication system capable of facilitating establishment of a WPAN, such as ZigBee, WLAN (WiFi) and UWB and efficiently managing the network, and a control method thereof.

Technical Solution

In an embodiment of the present invention, a communication system comprises a terminal apparatus far converting regional information or position information into network connection information, and a communication apparatus far performing network communication by generating a data packet comprising the network connection information.

In an embodiment of the present invention, a method far controlling a communication system comprises the steps of converting regional or position information input to a terminal into network connection information, transmitting the network connection information to a communication apparatus connected to a network, and performing network communication by generating a data packet comprising the network connection information using the communication apparatus.

Advantageous Effects

In embodiments of the present invention, a WPAN, such as ZigBee, WLAN (WiFi) and UWB, can be easily established and efficiently managed.

BEST MODE FOR CARRYING OUT THE INVENTION

Hereinafter, a communication system in embodiments of the present invention will be described in detail with reference to the accompanying drawings.

Figure 1:
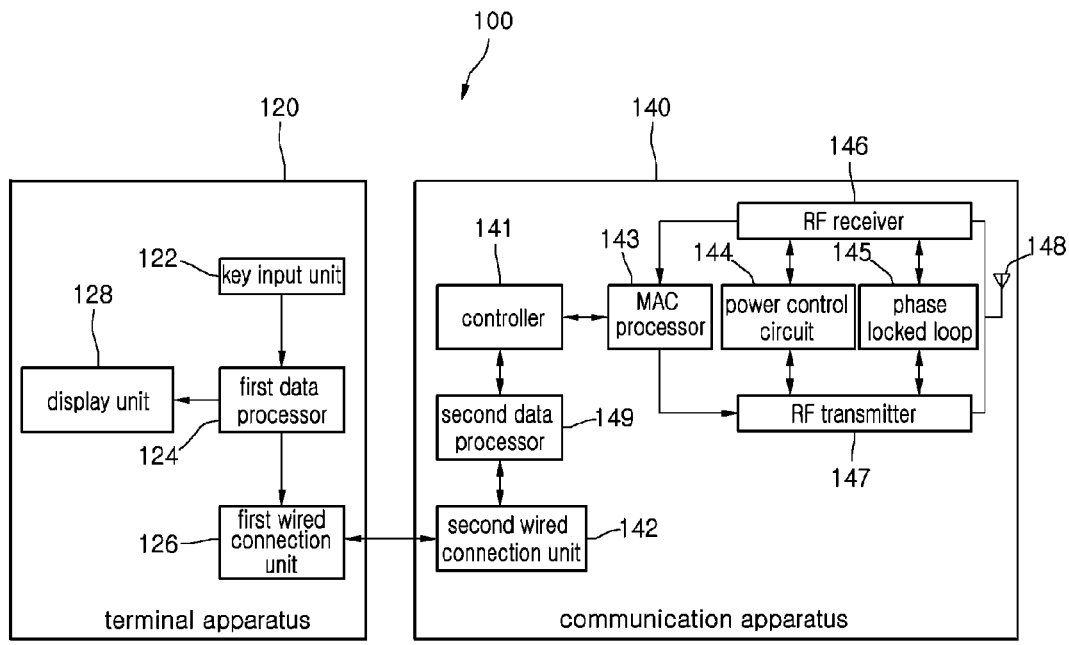
FIG. 1 is a black diagram showing a communication system in a first embodiment of the present invention.

FIG. 1 is a black diagram showing a communication system in a first embodiment of the present invention.

As shown in FIG. 1, the communication system 100 in the first embodiment comprises a terminal apparatus 120 for converting received regional information into network connection information of a communication apparatus 140, and the communication apparatus 140 for receiving the network connection information from the terminal apparatus 120. The communication apparatus 140 comprises one of ZigBee, WLAN (WiFi) and UWB apparatuses. Hereinafter, a case in which the communication apparatus 140 performs communication using a ZigBee scheme will be described.

The terminal apparatus 120 comprises a key input unit 122 allowing a use to input data, a display unit 128, a first wired connection unit 126 connected to the communication apparatus, and a first data processor 124 for converting information input through the key input unit 122 to the network connection information and transmitting the network connection information through the first wired connection unit 126.

Figure 2:
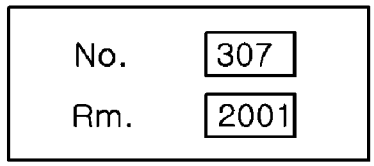
FIG. 2 is a view showing a user menu provided by a terminal apparatus of a communication system in a first embodiment of the present invention.

The first data processor 124 of the terminal apparatus 120 creates a user menu for receiving regional information to display the user menu on the display unit 128. FIG. 2 is a view showing a user menu provided by the terminal apparatus of the communication system in the first embodiment of the present invention. The communication system 100 serves as a networking system capable of controlling an environment system in facilities, and can be installed in various facilities such as officetel, office buildings, apartments and detached houses. In the first embodiment, the communication system 100 is installed in an apartment complex. The regional information comprises a numerical value representing a number, a floor and a room of an apartment. As shown in FIG. 2, the regional information can be input by denoting the general written system for an apartment complex. Referring to FIG. 2, "No. 307" represents "No. 7 in 3 Complex" and "Rm. 2001" represents "Rm. 1 of twentieth floor".

Further, the first data processor 124 of the terminal apparatus 120 converts the information input through the key input unit 122 to the network connection information. The first data processor 124 encodes the network connection information into information processable by the communication apparatus 140. The first data processor 124 transmits the network connection information to the communication apparatus 140 through the first wired connection unit 126.

The network connection information provided from the terminal apparatus 120 comprises information used when the communication apparatus 140 participates in a network.

For example, when the communication apparatus 140 establishes a Zigbee network, the network connection information comprises channel information and a PAN (personal area network) ID. A Zigbee channel has a frequency band of about 2.405 GHz to 2.8 GHz and is divided into 16 channels. However, when communication apparatuses adjacent to the communication apparatus 140 have network connection information allocated to adjacent channels or the same channel, interference may occur therebetween. Thus, the first data processor 124 of the terminal apparatus 120 generates the network connection information by taking characteristics of the regional information into consideration, thereby avoiding data collision between the adjacent communication apparatuses.

In order to avoid the data collision between the adjacent communication apparatuses, the first data processor 124 applies a written system for the regional information of an apartment complex to the network connection information. In detail, numerical values representing a number and a room of an apartment can be converted into PAN IDs and a numerical value representing a floor of the apartment can be converted into channel information.

In such a case, the first data processor 124 reflects the numerical values representing the number and room of the apartment to the PAN ID and reflects the numerical value representing the floor of the apartment to the channel information. The PAN ID has the total two bytes. When an address is "Rm. 2001, No. 307", the "07" representing a number of an apartment constitutes the first one byte and the "01" representing a room of the apartment constitutes the remaining one byte. Thus, the PAN ID can be converted into data such as "0x0701". Further, the channel information has one byte. The Zigbee channel has "16" channels ranging from channel "11" to channel "26". In the case of layers adjacent to each other, different channels are allocated to the layers to prevent data collision. Thus, when a resultant value obtained by dividing the numerical value representing the floor by the total number "16" of the channels is "zero", the channel information is set to "26". However, when the resultant value is not "zero", the channel information is set to a value obtained by adding "10" to the resultant value.

This can be expressed by the following program.
<network connection information conversion program>
"if numerical value representing floor % 16==0, CH=26
Else CH=numerical value representing floor % 16+10"

According to the conversion program, in the case that an apartment has "40" floors, channels ranging from channel "11" to channel "26" are sequentially allocated to floors "1" to "16", and the channels ranging from channel "11" to channel "26" are sequentially allocated to floors "17" to "32" again. Then, channels ranging from channel "11" to channel "18" are sequentially allocated to floors "33" to "40". In detail, the "16" Zigbee channels ranging from channel "11" to channel "26" are applied to the number of floors in a loop. Thus, interference may not occur between networks established in each household.

As described above, since the written system for the regional information of the apartment complex is applied to the network connection information, an additional allocation system is not necessary. Further, a user can easily establish a network by simply inputting an address to the terminal apparatus 120.

Meanwhile, when a network is established in a shop, the first data processor 124 can apply position information of exhibited products to network connection information. In detail, the first data processor 124 can convert exhibition areas of products, the number of shelves and the arrangement sequence of the products into PAN IDs and channel information.

When a WPAN is established using a communication scheme such as a WLAN (WiFi) and a UWB instead of the Zigbee communication scheme, the first data processor 124 of the terminal apparatus 120 generates the network connection information used for establishing a network using the corresponding communication scheme according to characteristics of regional information.

The first data processor 124 transmits the network connection information generated based on the regional or position information to a second wired connection unit 142 of the communication apparatus 140 through the first wired connection unit 126.

The first wired connection unit 126 can transmit/receive the network connection information to/from the second wired connection unit 142 using a wired communication scheme. Wired communication technology between the first wired connection unit 126 and the second wired connection unit 142 can employ a USB (universal serial bus), a UART (universal asynchronous receiver/transmitter) and the like. In the case of using the USB communication, a high transmission/reception speed can be obtained, connection is facilitated and an additional power source is not necessary as compared with general serial port communication. Further, the UART communication provides an RS-232C DTE interface as a micro chip controlling a data transmission/reception interface.

The terminal apparatus 120 having such construction can be prepared in the form of various terminals such as a dedicated terminal generating the network connection information or a mobile communication terminal having such a function. In the present embodiment, the terminal apparatus 120 is prepared in the form of the dedicated terminal.

The communication apparatus 140 comprises the second wired connection unit 142 and a second data processor 149 for communication with the terminal apparatus 120, an MAC (media access controller) processor 143 for processing a radio signal for network connection, a power control circuit 144, a phase lacked loop 145, an RF receiver 146, an RF transmitter 147, an antenna 148 and a controller 141 for controlling these elements.

The communication apparatus 140 constitutes a node of a network adopting each room of an apartment as a basic unit and operates as an FFD (full function device) module, an RFD (reduced function device) module or a PAN coordinator according to a function thereof. The communication apparatus 140 can be prepared in the form of a plurality of FFD modules performing a routing function, the RFD module controlling an appliance such as an illuminator, a humidifier, a dehumidifier, an air conditioner and a heater, and a single PAN coordinator controlling the above modules. The FFD module communicates with another FFD module or the RFD module by performing functions of initializing a network, managing a node and storing information on the node. The FFD module enabling construction of the network is called the PAN coordinator module. The RFD module is a Zigbee module that does not perform a coordinator function, is coordinated by the FFD module and communicates only with the FFD module.

The communication apparatus 140 operates as the FFD module, the FFD module or the PAN coordinator according to the type of program stored in the controller 141.

Figure 3:
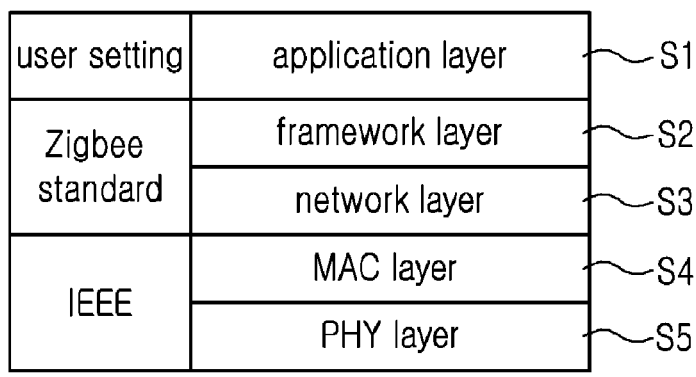
FIG. 3 is a view illustrating a data protocol stack structure of a communication system in a first embodiment of the present invention.

FIG. 3 is a view illustrating a protocol stack structure showing an area of data transmitted from or received in the communication system in the first embodiment, and shows a protocol stack structure when a Zigbee network is used.

As illustrated in FIG. 3, a Zigbee protocol stack comprises a PHY (physical) layer S5, an MAC layer S4, a network layer S3, an application framework layer (hereinafter, referred to as framework layer) S2, and an application/profiles layer S1. The PHY layer S5 and the MAC layer S4 are based on an IEEE standard, the network layer S3 and the framework layer S2 are based on a Zigbee alliance standard, and the application/profiles layer S1 are based on application program related to database management and control information generation.

Thus, the communication apparatus 140 can operate as the FFD module, the FFD module or the PAN coordinator according to the type of the program stored in the controller 141, i.e. the type of program for processing data of the network layer S3 and the framework layer S2.

The RF receiver 146, the RF transmitter 147, the phase lacked loop 145 and the power control circuit 144 process an operation corresponding to the PHY layer S5 to determine an RF communication structure and a network topology.

The RF receiver 146 and the RF transmitter 147 use a DSSS (direct sequence spread spectrum). In the case of 2.4 GHz band, the RF receiver 146 and the RF transmitter 147 mutually convert an RF signal and a digital signal using an O-QPSK (offset-quadrature phase shift keying) modulation/demodulation scheme.

The phase lacked loop 145 provides an oscillation frequency signal to the RF receiver 146 and the RF transmitter 147, and the power control circuit 144 adjusts the amount of transmitted power by determining the intensity of a received signal.

The MAC processor 143 interprets the structure of a transmitted data frame to approve the frame, determine retransmission by detecting an error through a CRC or a checksum, and processes packet routing.

The controller 141 establishes a network topology by performing functions of the software-MAC layer, the network layer S3, the framework layer S2, and manages a database and generates control information by performing a function of the application/profiles layer S1.

Figure 4:
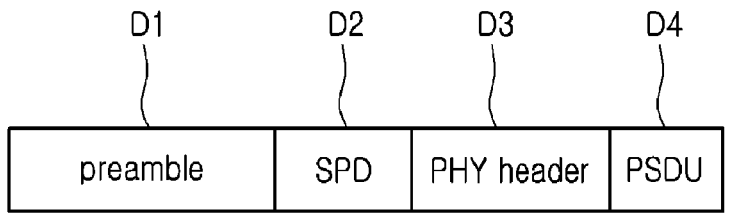
FIG. 4 is a view schematically illustrating a data packet processed by a communication system in a first embodiment of the present invention.

FIG. 4 is a view schematically illustrating a data packet processed by the communication system in the first embodiment of the present invention, and shows an example of data structure in which Zigbee communication is used.

The data packet used for the Zigbee communication, which is generated by the controller 141 of the communication apparatus 140, comprises a preamble D1, an SPD (start of packet delimiter) D2, a PHY header D3, a PSDU (PHY service data unit) D4 and the like. The preamble D1 (or beacon can be used) is a series of pulse signal which can be interpreted between Zigbee modules in order to synchronize transmission timing. The SPD D2 informs an opponent Zigbee module that packet data has actually started while indicating an interpretation time point of the PHY header D3. The PHY header D3 stores interpretation information of the PHY layer S5 and the PSDU D4 comprises application data together with routing information.

The second wired connection unit 142 receives the network connection information from the first wired connection unit 126, and the second data processor 149 decodes the network connection information to extract the channel information and the PAN IDs.

The controller 141 loads the extracted PAN IDs and channel information on the PSDU D4 to complete the data packet. The controller 141 participates in a network by transmitting the completed data packet to another communication apparatus constituting each node.

Further, the controller 141 is programmable to control an apparatus to be controlled, such as an illuminator, a humidifier, a dehumidifier, an air conditioner and a heater.

In the above description, the packet data used when the WPAN is established using the Zigbee communication scheme is shown. However, when the WPAN is established using another communication scheme such as a WLAN (WiFi) and a UWB (Ultra Wide Band), the controller 141 of the communication apparatus 140 can perform a control operation to process corresponding protocols.

Figure 5:
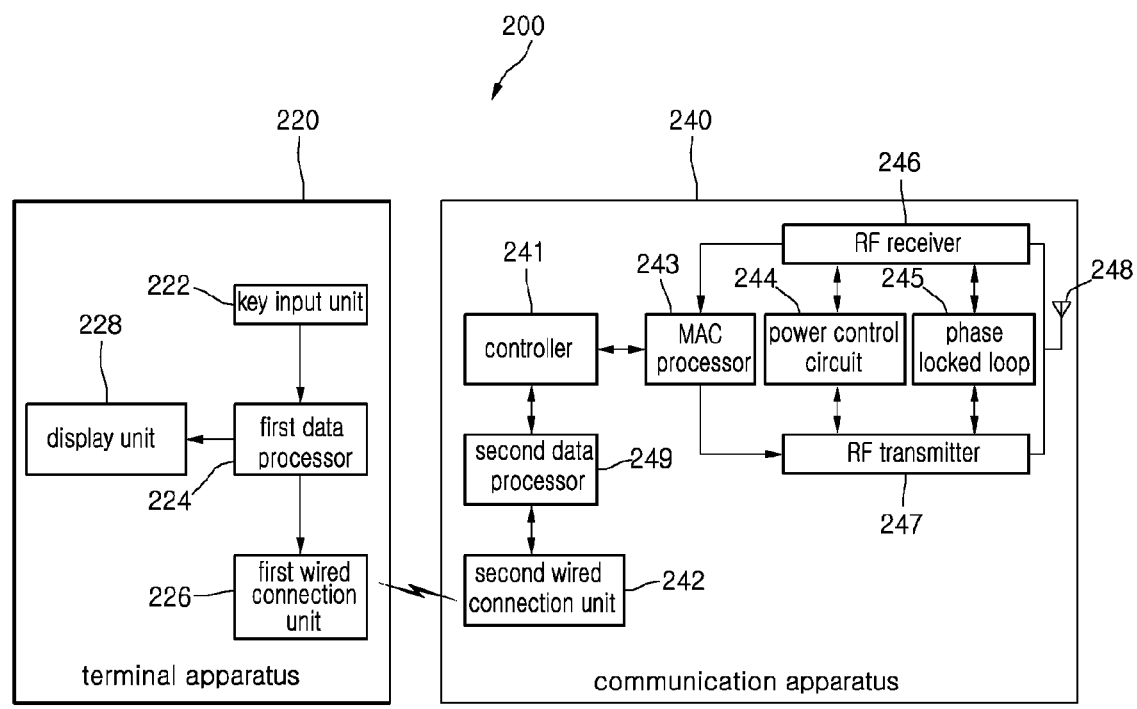
FIG. 5 is a black diagram showing a communication system in a second embodiment of the present invention.

FIG. 5 is a black diagram showing a communication system in a second embodiment of the present invention.

As shown in FIG. 5, the communication system 200 in the second embodiment comprises a terminal apparatus 220 for converting regional information into network connection information, and the communication apparatus 240 for transmitting/receiving data through a network by using the network connection information provided from the terminal apparatus 120.

The terminal apparatus 220 comprises a key input unit 222, a display unit 228, a first data processor 224 for generating the network connection information by converting regional information input from the key input unit 122, and a first wireless connection unit 226 for wirelessly transmitting the network connection information generated by the first data processor 224.

The communication apparatus 240 comprises a second wireless connection unit 242 and a second data processor 249 for receiving and processing the network connection information, an MAC processor 243 for Zigbee communication, a power control circuit 244, a phase lacked loop 245, an RF receiver 246, an RF transmitter 247, an antenna 248 and a controller 241 for controlling these elements.

The communication system 200 according to the second embodiment is identical to the communication system 100 according to the first embodiment, except that the terminal apparatus 220 and the communication apparatus 240 include the wireless connection units 226 and 242, respectively, to transmit the network connection information through a wireless local area network.

For the purpose of convenience, a description overlapping with that of the first embodiment will be omitted in order to avoid redundancy.

The first and second wireless connection units 226 and 242 can transmit/receive the network connection information using the wireless local area network such as a NFC (near field communication), an RFID (radio frequency identification), a Wi-Fi, a UWB (ultra wide band), a Bluetooth, a WiMax (world interoperability for microwave access), and a DSRC (dedicated short range communication).

When the first and second wireless connection units 226 and 242 transmit/receive the network connection information through the wireless local area network, a user inputs regional information on an apartment to the terminal apparatus 220 and approaches the terminal apparatus 220 to the communication apparatus 240 operating as a PAN coordinator, so that a Zigbee home network can be activated.

Figure 6:
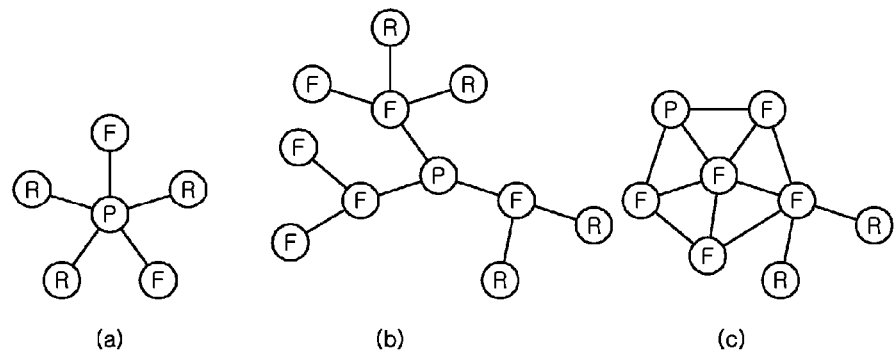
FIG. 6 is a view illustrating a network topology of a communication system in a first embodiment of the present invention.

FIG. 6 is a view illustrating a network topology constructed by the communication apparatus in the embodiments of the present invention. Referring to FIG. 6, Zigbee apparatuses indicated by "F" represent FFD modules, Zigbee apparatuses indicated by "R" represent RFD modules, and Zigbee apparatuses indicated by "P" represent PAN coordinators.

FIG. 6A shows a star network in which the Zigbee apparatuses are connected with the PAN coordinator. FIG. 6B shows a mesh network and FIG. 6C shows a cluster tree network.

As illustrated in FIG. 6, the communication apparatuses 140 and 240 receiving the network connection information from the terminal apparatuses 120 and 220 in the embodiments of the present invention can construct various types of communication systems.

Figure 7:
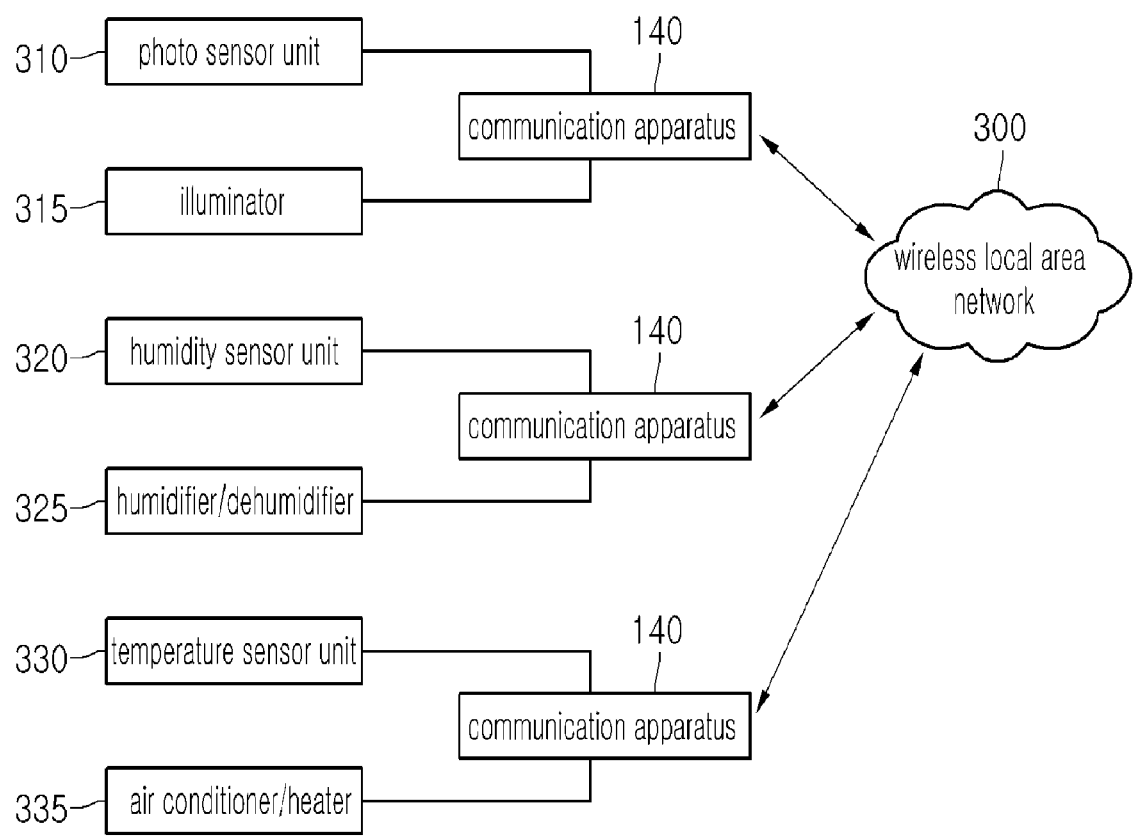
FIG. 7 is a view illustrating an example in which a communication apparatus in embodiments of the present invention are connected with an external apparatus.

FIG. 7 is a view illustrating an example in which the communication apparatuses in the embodiments of the present invention are connected with an external apparatus.

The communication apparatuses 140 and 240 are provided to households constituting each room of an apartment to form home networks. The communication apparatuses 140 and 240 are connected with an external apparatus such as a photo sensor unit 310, a humidity sensor unit 320, a temperature sensor unit 330, an illuminator 315, a humidifier/dehumidifier 325, and an air conditioner/heater 335.

Further, the communication apparatuses 140 and 240 can be connected with the photo sensor unit 310 and the illuminator 315, the humidity sensor unit 320 and the humidifier/dehumidifier 325, the temperature sensor unit 330 and the air conditioner/heater 335, respectively, thereby controlling the operations of the illuminator 315, the humidifier/dehumidifier 325 and the air conditioner/heater 335 according to each sensing information.

For example, the illuminator 315 may include a general fluorescent lamp installed in a building, and the controllers 141 and 241 of the communication apparatuses 140 and 240 can control a driving circuit such as an actuator and a relay system provided to the illuminator 315 according to illumination sensing information of the photo sensor unit 310. The photo sensor unit 310 detects illumination variation in a building to generate illumination variation information. For example, the photo sensor unit 310 may use a photodiode, a phototransistor, a photoconductive cell, a pyroelectric device and the like.

Although embodiments have been described with reference to a number of illustrative embodiments thereof, it should be understood that numerous other modifications and embodiments can be devised by those skilled in the art that will fall within the spirit and scope of the principles of this disclosure.

INDUSTRIAL APPLICABILITY

The communication system and the control method thereof in the embodiments of the present invention can be applied to wireless communication network technology.

The invention claimed is:

1. A communication system comprising:
a terminal apparatus converting regional information or position information into network connection information, wherein the network connection information is configured to establish a wireless personal area network (WPAN) network; and
a communication apparatus performing network communication by generating a data packet comprising the network connection information;
wherein the terminal apparatus transmits the network connection information to the communication apparatus connected to the WPAN network;
wherein the regional or position information is applied to the network connection information;
wherein the regional or position information comprises a first numerical value representing a number of a building, a second numerical value representing a room number of the building, and a third numerical value representing a floor number of the building, wherein the network connection information comprises PAN IDs and channel information;
wherein the terminal apparatus converts the first numerical value and the second numerical value into each PAN ID wherein each PAN ID has two bytes and converts the third numerical value into the channel information using a conversion program to allocate different channels to different floors adjacent to each other; and
wherein the first byte of each PAN ID comprises the first numerical value and the remaining one byte of each PAN ID comprises the second numerical value.

2. The communication system as claimed in claim 1, wherein the terminal apparatus comprises:
a first data processor converting the received regional or position information into the network connection information; and
a first connection unit transmitting the network connection information to the communication apparatus.

3. The communication system as claimed in claim 2, wherein the communication apparatus comprises:
a second connection unit receiving the network connection information from the first connection unit;
a second data processor interpreting the network connection information; and
a controller generating the data packet according to the interpreted network connection information and processing protocols.

4. The communication system as claimed in claim 2, wherein the terminal apparatus comprises:
a display displaying a user menu for receiving the regional or position information; and
a key input unit receiving the regional or position information to transmit the received information to the first data processor.

5. The communication system as claimed in claim 2, wherein the first and second connection units transmit/receive the network connection information using at least one wireless communication scheme of an NFC (near field communication), an RFID (radio frequency identification), Wi-Fi, a UWB (ultra wide band), a Bluetooth, a WiMax (world interoperability for microwave access), and a DSRC (dedicated short range communication).

6. The communication system as claimed in claim 2, wherein the first and second connection units transmit/receive the network connection information using at least one wired communication scheme of a USB (universal serial bus), a UART (universal asynchronous receiver/transmitter), an SPI (serial peripheral interface) and an I2C (inter-integrated circuit).

7. The communication system as claimed in claim 2, wherein the communication apparatus comprises:
   an RF transmitter and an RF receiver transmitting and receiving an RF signal through the network;
   a phase locked loop providing an oscillation frequency signal to the RF transmitter and the RF receiver; and
   a power control circuit adjusting amount of power of a signal transmitted from the RF transmitter by determining intensity of a signal received through the network; and
   an MAC processor processing data of an MAC layer according to the network connection information.

8. The communication system as claimed in claim 1, wherein the network connection information comprises one-byte channel information and two-byte PAN IDs.

9. The communication system as claimed in claim 1, wherein the communication apparatus is connected with at least one of a photo sensor unit, a humidity sensor unit, a temperature sensor unit, an illuminator, a humidifier, a dehumidifier, an air conditioner and a heater, and is connected with the network to control operations of the photo sensor unit, the humidity sensor unit, the temperature sensor unit, the illuminator, the humidifier, the dehumidifier, the air conditioner and the heater.

10. The communication system as claimed in claim 1, wherein the WPAN network comprises at least one of Zigbee, WLAN (WiFi) and UWB.

11. A method for controlling a communication system, the method comprising:
   receiving regional or position information including a first numerical value representing a number of a building, a second numerical value representing a room number of the building, and a third numerical value representing a floor number of the building;
   converting the first numerical value, the second numerical value, and the third numerical value into network connection information, wherein the network connection information is configured to establish a wireless personal area network (WPAN) network;
   transmitting the network connection information to a communication apparatus connected to the WPAN network; and
   performing network communication by generating a data packet comprising the network connection information using the communication apparatus;
   wherein the regional or position information is applied to the network connection information;
   wherein the network connection information comprises channel information and PAN IDs wherein each PAN ID has two bytes;
   wherein the terminal apparatus converts the first numerical value representing the building number and the second numerical value representing the room number of the building into each PAN ID and converts the third numerical into the channel information using a conversion program to allocate different channels to different floors adjacent to each other; and
   wherein a first byte of each PAN ID comprises the first numerical value and a second byte of each PAN ID comprises the second numerical value.

12. The method as claimed in claim 11, wherein the WPAN network comprises at least one of Zigbee, WLAN (WiFi) and UWB.

13. The method as claimed in claim 11, wherein, in the step of transmitting the network connection information to the communication apparatus, the network connection information is transmitted to the communication apparatus using at least one wireless communication scheme of an NFC (near field communication), an RFID (radio frequency identification), Wi-Fi, a UWB (ultra wide band), a Bluetooth, a WiMax (world interoperability for microwave access), and a DSRC (dedicated short range communication).

14. The method as claimed in claim 11, wherein, in the step of transmitting the network connection information to the communication apparatus, the network connection information is transmitted to the communication apparatus using at least one wired communication scheme of a USB (universal serial bus), a UART (universal asynchronous receiver/transmitter), an SPI (serial peripheral interface) and an I2C (inter-integrated circuit).

\* \* \* \* \*